United States Patent [19]

Kitatani et al.

[11] Patent Number: 4,882,249
[45] Date of Patent: Nov. 21, 1989

[54] TETRAKISAZO PHOTOCONDUCTIVE COMPOSITION AND ELECTROPHOTOGRAPHIC PHOTORECEPTOR USING THE SAME

[75] Inventors: Katsugi Kitatani; Satoshi Hoshi, both of Kanagawa, Japan

[73] Assignee: Fuji Photo Film Co., Ltd., Kanagawa, Japan

[21] Appl. No.: 243,358

[22] Filed: Sep. 12, 1988

[30] Foreign Application Priority Data

Sep. 11, 1987 [JP] Japan ................... 62-228029

[51] Int. Cl.$^4$ .................. G03G 5/06; G09B 35/64
[52] U.S. Cl. .......................... 430/56; 430/58; 430/59; 430/71; 430/72; 430/76; 430/78; 534/738; 534/754; 534/755; 534/806
[58] Field of Search ............ 430/56, 58, 59, 71, 430/72, 76, 78; 534/738, 754, 755, 806

[56] References Cited

U.S. PATENT DOCUMENTS

4,666,810  5/1987  Umehara et al. ............... 430/72

FOREIGN PATENT DOCUMENTS

| | | | |
|---|---|---|---|
| 60-108857 | 6/1985 | Japan | 534/755 |
| 60-108858 | 6/1985 | Japan | 534/755 |
| 60-111247 | 6/1985 | Japan | 534/755 |
| 60-111248 | 6/1985 | Japan | 534/755 |
| 61-103157 | 5/1986 | Japan | 430/58 |
| 61-122652 | 6/1986 | Japan | 534/806 |
| 61-212848 | 9/1986 | Japan | 430/58 |
| 61-284769 | 12/1986 | Japan | 430/58 |

*Primary Examiner*—Paul R. Michl
*Assistant Examiner*—Jeffrey A. Lindeman
*Attorney, Agent, or Firm*—Sughrue, Mion, Zinn, Macpeak and Seas

[57] ABSTRACT

Disclosed are a photoconductive composition containing a new tetrakisazo compound of the following formula (1) and an electrophotographic photoreceptor having a photosensitive layer which contains the tetrakisazo compound of the formula (1):

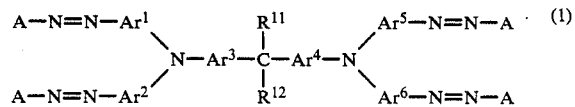

wherein $R^{11}$, $R^{12}$, A, $Ar^1$, $Ar^2$, $Ar^3$, $Ar^4$, $Ar^5$, and $Ar^6$ are defined hereinbefore. The electrophotographic photoreceptor has both high sensitivity and high durability, and the sensitivity thereof is barely lowered even after repeated use.

17 Claims, No Drawings

TETRAKISAZO PHOTOCONDUCTIVE COMPOSITION AND ELECTROPHOTOGRAPHIC PHOTORECEPTOR USING THE SAME

FIELD OF THE INVENTION

The present invention relates to a photoconductive composition containing a new tetrakisazo compound and to an electrophotographic photoreceptor having an electrophotographic light-sensitive layer which contains the tetrakisazo compound.

BACKGROUND OF THE INVENTION

The light-conducting process in an electrophotographic photoreceptor comprises:

(1) a step of generating an electric charge by exposure, and (2) a step of transporting the electric charge.

As an example of conducting both of the steps (1) and (2) in one substance, there is a selenium photosensitive plate. On the other hand, as an example of conducting the steps (1) and (2) separately in different substances, a combination comprising amorphous selenium and poly-N-vinylcarbaxole has been well known. The method of conducting the steps (1) and (2) separately in different substances is advantageous in that this may broaden the range of materials available for use in electrophotographic photoreceptors along with improving the electrophotographic characteristics, such as sensitivity and acceptable potential, of electrophotographic photoreceptors and, additionally, substances preferable for formation of coating films on photoreceptors may be selected from a broad range.

As already described by Carson in U.S. Pat. No. 2,297,691, a photoconductive material is used in electrophotography, having a substance which is insulating in the dark and whose electric resistance may vary in accordance with the imagewise exposure imparted thereto, coated on a support. In general, the photographic material is first processed to have a uniform surface charge in the dark, after dark adaptation for a while. Next, the material is imagewise exposed through a light-irradiating pattern which has the effect of reducing the surface charge in accordance with the relative energy contained in the various parts of the light-irradiating pattern. The surface charge or electrostatic latent image that remains on the surface of the photoconductive substance layer (electrophotographic photosensitive layer) is then converted into a visible image after the surface has been brought into contact with an appropriate charge-detecting and displaying substance, i.e., a toner.

The toner is contained in an insulating liquid or a dry carrier, and in either case, this may be applied to the surface of the electrophotographic photosensitive layer in accordance with the charge pattern formed. The displaying substance (toner) thus applied to the image surface may be fixed by conventional means such as heat, pressure or solvent vapor. The electrostatic latent image may be transferred to a second support (for example, paper or film). In the same manner, the electrostatic latent image transferred to the second support may be developed thereon. Electrophotography is one of image-forming methods where any desired images are formed in accordance with the processes mentioned above.

In such electrophotography, fundamental characteristics required for electrophotographic photoreceptors include, for example, the following: (1) they can be charged to a pertinent potential in the dark, (2) they barely lose the charge in the dark, and (3) they can rapidly release the charge after light-irradiation.

The above-mentioned inorganic substances which have heretofore been used in electrophotography have not only various merits but also various demerits, as a matter of fact. For example, selenium which is widely used at present may sufficiently satisfy the above-mentioned conditions (1) to (3), but the manufacturing is difficult and complicated and the manufacturing cost is high. In addition, the manufacturing process has no flexibility and the electrophotographic photoreceptor can barely be formed into a belt-shaped product. Further, as the electrophotographic photoreceptor is sensitive to heat and mechanical shock, special care is required for handling the same. Thus selenium has various defects. Cadmium sulfide and zinc oxide are used as an electrophotographic photoreceptor, after being dispersed in a resin as a binder. However, these electrophotographic photoreceptors have mechanical defects in smoothness, hardness, tensile strength and abrasion resistance, and so these cannot be repeatedly used as they are.

Recently, electrophotographic photoreceptors having various organic substances have been suggested in order to overcome the defects of the inorganic substances, and some have been put to practical use. For example, there are an electrophotographic photoreceptor comprising poly-N-vinylcarbazole and 2,4,7-trinitrofluoren-9-one (U.S. Pat. No. 3,484,237); an electrophotographic photoreceptor having poly-N-vinylcarbazole sensitized with a pyrylium salt dye (JP-B-48-25658) (the term "JP-B" as used hereinmeans an "examined Japanese patent publication"); and an electrophotographic photoreceptor having as a main component an eutectic complex comprising a dye and a resin (JP-A-47-10735) (the term "JP-A" as used herein means an "unexamined published Japanese patent application"). In addition, electrophotographic photoreceptors having an azo pigment as a main component have widely been studies recently and various proposals have been made as described in, for example, U.S. Pat. Nos. 3,898,084, 4,618,672, 4,396,696, 4,356,243, 4,743,523, 4,666,810, 4,436,800, 4,439,506, 4,447,513, 4,598,033, 4,568,623, 4,533,613, 4,619,881, and 4,702,982.

The organic electrophotographic photoreceptors are superior to the above-mentioned inorganic electrophotographic photoreceptors as the former can have somewhat improved mechanical characteristics and flexibility. However, the organic electrophotographic photoreceptors are generally poor in light sensitivity when used many times and therefore these are unsuitable for repeated use. Thus the above-mentioned organic substances cannot always sufficiently satisfy the requirements for electrophotographic photoreceptors.

SUMMARY OF THE INVENTION

One object of the present invention is to provide a new electrophotographic photoreceptor having both high sensitivity and high durability.

Another object of the present invention is to provide a new electrophotographic photoreceptor whose light sensitivity barely lowers even after repeated use.

Still another object of the present invention is to provide a new photoconductive composition which may be used in various electrophotographic photoreceptors.

In order to attain these objects, the present invention provides a photoconductive composition comprising a new tetrakisazo compound (tetrakisazo pigment) represented by the following formula (1) and also provides an electrophotographic photoreceptor having an electrophotographic photosensitive layer which contains the tetrakisazo compound.

(I) specifically, the present invention provides a photoconductive composition comprising at least one tetrakisazo compound represented by the following formula (1):

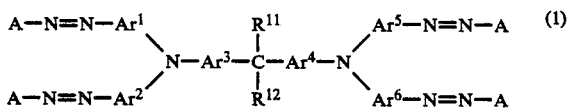

where $R^{11}$ and $R^{12}$ independently represent hydrogen atom or a substituted or unsubstituted alkyl, aryl or aralkyl group, and $R^{11}$ and $R^{12}$ may be the same or different; $Ar^1$, $Ar^2$, $Ar^3$, $Ar^4$, $Ar^5$, and $Ar^6$ independently represent a substituted or unsubstituted arylene group;

A represents

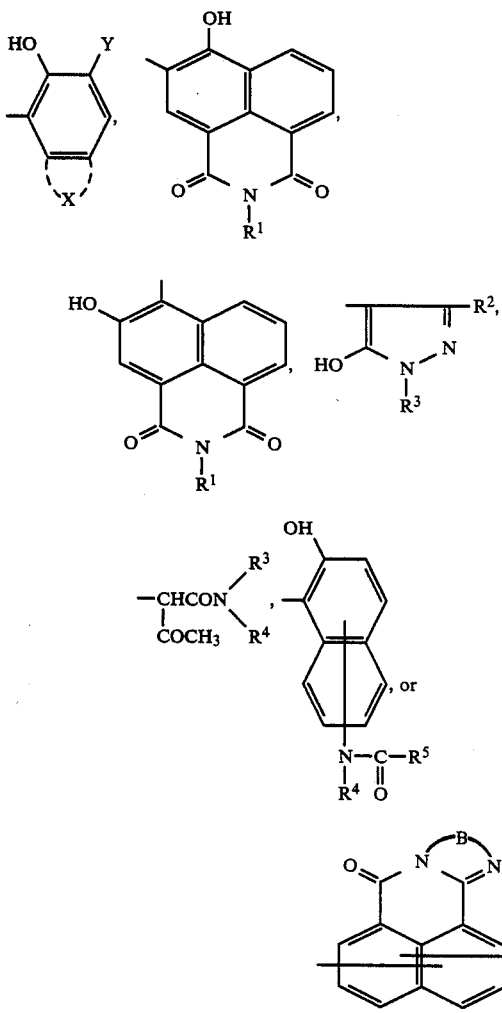

X represents a group that forms an aromatic ring or a heterocyclic ring, which is substituted or unsubstituted, by condensation with the benzene ring in the aforesaid formula having hydroxyl group and Y on the ring;

Y represents

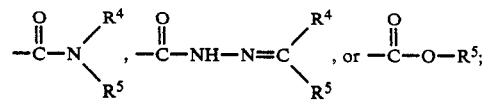

$R^1$ represents an alkyl group, a phenyl group or a substituted group thereof;

$R^2$ represents hydrogen atom, a lower alkyl group, a carbamoyl group, a carboxyl group, an alkoxycarbonyl group, an aryloxycarbonyl group, or a substituted or unsubstituted amino group;

$R^3$ represents an alkyl group, an aromatic group, a hetero-aromatic group, or a substituted group thereof;

$R^4$ and $R^5$ independently represent hydrogen atom, an alkyl group, an aromatic group, a hetero-aromatic group, or a substituted group thereof, provided that both $R^4$ and $R^5$ are not hydrogen atoms at the same time, and when Y represents

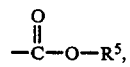

$R^5$ is not hydrogen atom; and

B represents a divalent group that forms an aromatic hydrocarbon or a divalent group that forms a hereto ring which contains one or more nitrogen atoms in the ring, and the ring is unsubstituted or substituted.

(II) The present invention further provides an electrophotographic photoreceptor having a layer which contains a charge carrier-transporting compound and a charge carrier-generating compound or having a charge carrier-transporting compoound-containing layer and a charge carrier-generating compound-containing layer, on an electroconductive support, wherein the charge carrier-generating compound is the tetrakisazo compound of the above-described formula (1).

DETAILED DESCRIPTION OF THE INVENTION

The tetrakisazo compounds represented by the above-described formula (1) are described in detail hereunder.

X represents a group that forms an aromatic ring (e.g., naphthalene, anthracene) or a heterocyclic ring (e.g., indole, carbazole, benzocarbazole, dibenzofuran) by condensation with the benzene ring in the aforesaid formula having hydroxyl group and Y thereon.

When X represents a group that forms a substituted aromatic ring or hetero ring, substituents for the ring may be a halogen atom (e.g., fluorine, chlorine, bromine), and a lower alkyl group, preferably a lower alkyl group having from 1 to 8 carbon atoms (e.g., methyl, ethyl, propyl, butyl, isopropyl, isobutyl). The number of substituents may be one or two, and when two substituents are on the group, these may be the same or different.

$R^1$ may be an alkyl group, preferably an alkyl group having from 1 to 12 carbon atoms, or a phenyl group each of which is substituted or unsubstituted.

When $R^1$ represents an unsubstituted alkyl group, specific examples of the group include methyl, ethyl, propyl, butyl, pentyl, hexyl, isopropyl, isobutyl, isoamyl, isohexyl, neopentyl, and tert-butyl.

When $R^1$ represents a substituted alkyl group, substituents for the group may be hydroxyl group, an alkoxy group having from 1 to 12 carbon atoms, a cyano group, an amino group, an alkylamino group having from 1 to 12 carbon atoms, a dialkylamino group having two alkyl groups each with from 1 to 12 carbon atoms, a halogen atom, and an aryl group having from 6 to 15 carbon atoms. As examples of the substituted alkyl group, there are a hydroxyalkyl group (e.g., hydroxymethyl, 2-hydroxyethyl, 3-hydroxypropyl, 2-hydroxypropyl), an alkoxyalkyl group (e.g., methoxymethyl, 2-methoxyethyl, 3-methoxypropyl, ethoxymethyl, 2-ethoxyethyl), a cyanoalkyl group (e.g., cyanomethyl, 2-cyanoethyl), an aminoalkyl group (e.g., aminomethyl, 2-aminoethyl, 3-aminopropyl), an (alkylamino)alkyl group (e.g., (methylamino)methyl, 2-methylamino)ethyl, (ethylamino)methyl), a (dialkylamino)alkyl group (e.g., (dimethylamino)methyl, 2-(dimethylamino)ethyl), a haloalkyl group (e.g., fluoromethyl, chloromethyl, bromomethyl), and an aralkyl group (e.g., benzyl, phenethyl).

When $R^1$ represents a substituted phenyl group, substituents for the group include hydroxyl group, an alkoxy group having from 1 to 12 carbon atoms, a cyano group, an amino group, an alkylamino group having form 1 to 12 carbon atoms, a dialkylamino group having two alkyl groups each with from 1 to 12 carbon atoms, a halogen atom, an alkyl group having from 1 to 6 carbon atoms, and a nitro group. As examples of the substituted phenyl group, there are hydroxyphenyl group, an alkoxyphenyl group (e.g., methoxyphenyl, ethoxyphenyl), cyanophenyl group, aminophenyl group, an (alkylamino)phenyl group (e.g., (methylamino)phenyl, (ethylamino)phenyl), a (dialkylamino)phenyl group (e.g., (dimethylamino)phenyl), a halophenyl group (e.g., fluorophenyl, chlorophenyl, bromophenyl), an alkylphenyl group (e.g., totyl, ethylphenyl, cumenyl, xylyl, mesityl), a nitrophenyl group as well as phenyl groups having two or three of the substituents (which may be either the same or different). The position of the substituent and the mutual relation of the positions of plural substituents, if any, are not restricted inthe substituted phenyl group.

$R^2$ represents hydrogen atom, a lower alkyl group, preferably a lower alkyl group having from 1 to 6 carbon atoms, a carbamoyl group, a carboxyl group, an alkoxycarbonyl group, preferably an alkoxycarbonly group having an alkoxy group with from 1 to 12 carbon atoms, an aryloxycarbonyl group, preferably an aryloxycarbonyl group having an aryloxy group with from 6 to 20 carbon atoms or a substituted or unsubstituted amino group.

When $R^2$ represents a substituted amino group, specific examples of the group include methylamino, ethylamino, propylamino, phenylamino, tolylamino, benzylamino, phenethylamino, dimethylamino, diethylamino, and diphenylamino.

When $R^2$ represents a lower alkyl group, specific examples of the group include methyl, ethyl, propyl, butyl, isopropyl, and isobutyl.

When $R^2$ represents an alkoxycarbonyl group, specific examples of the group include methoxycabonyl, ethoxycarbonyl, propoxycarbonyl, butoxycarbonyl, isopropoxycarbonyl, and benzyloxycarbonyl.

When $R^2$ represents an aryloxycarbonyl group, specific examples of the group include phenoxycarbonyl and tolyoxycarbonyl.

$R^3$ represents an alkyl group, preferably an alkyl group having from 1 to 20 carbon atoms, an aromatic group (e.g., phenyl, naphthyl), a hetero-romatic group, preferably a hetero-aromatic group having one or more hetero atoms of oxygen, nitrogen and/or sulfur (e.g., dibenzofuranyl, carbazolyl, benzocarbazolyl), or a substituted group thereof.

When $R^3$ represents a substituted or unsubstituted alkyl group, specific examples of the group may be those for the above-mentioned substituted or unsubstituted alkyl group for $R^1$.

When $R^3$ represents a substituted aromatic group, such as a substituted phenyl group or a substituted naphthyl group, or a hetero atom-containing substituted hetero-aromatic group such as a substituted dibenzofuranyl group or a substituted carbazolyl group, examples of substituents for the groups include hydroxyl group, a cyano group, a nitro group, a halogen atom (e.g., fluorine, chlorine, bromine), an alkyl group having from 1 to 12 carbon atoms (e.g., methyl, ethyl, propyl, isopropyl), an alkoxy group having from 1 to 12 carbon atoms (e.g., methoxy, ethoxy, propoxy, butoxy, pentyloxy, isopropoxy, isobutoxy, isoamyloxy, tertbutoxy, neopentyloxy), an amino group, an alkylamino group having from 1 to 12 carbon atoms (e.g., methylamino, ethylamino, propylamino), a dialkylamino group having from 1 to 12 carbon atoms (e.g., dimethylamino, diethylamino, N-methyl-N-ethylamino), an arylamino group having from 6 to 12 carbon atoms (e.g., phenylamino, tolylamino), a diarylamino group having two aryl groups each with from 6 to 15 carbon atoms (e.g., diphenylamino), a carboxyl group, an alkali metal carboxylato group (examples of the alkali metal (cation) are Na+, K+, and Li+), an alkali metal sulfonato group (examples of the alkali metal (cation) are Na+, K+, and Li+), an alkylcarbonyl group (e.g., acetyl, propionyl, benzylcarbonyl), an arylcarbonyl group having an aryl group with from 6 to 12 carbon atoms (e.g., benzoyl, toluoyl), an alkylthio group having from 1 to 12 carbon atoms (e.g., methylthio, ethylthio), and an arylthio group having from 1 to 12 carbon atoms (e.g., phenylthio, tolyllthio); and the number of substituents is from 1 to 3. when plural substituents are on the group, these may be the same or different in any desired combination, and the position of the substituents is not limited.

$R^4$ and $R^5$ independently represent hydrogen atom or the same group as described above for $R^3$, provided that both $R^4$ and $R^5$ are not hydrogen atoms at the same time.

When A represents

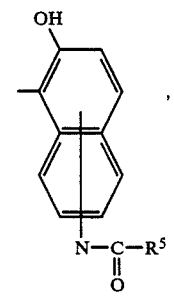

the moiety

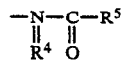

may be positioned at any position of 3- to 8-positions on the naphthalene ring, and preferably at the 8-position.

B represents a divalent group that forms an aromatic hydrocarbon or a divalent group that forms a hetero ring which contains one or more nitrogen atoms in the ring, and the ring is substituted or unsubstituted. When the ring is substituted, the substituents include an alkyl group, a halogen atom, a nitro group, or hydroxyl group. As examples of the aromatic hydrocarbon formed by the divalent group, there are o-phenylene, o-naphthylene, peri-naphthylene, 1,2-anthraquinonylent, and 9,10-phenanthrylene. As examples of the heterocyclic group having one or more nitrogen atoms in the ring and formed by the divalent group, there are 3,4-pyrazole-diyl, 2,3-pyridiyl, 4,5-pyrimidine-diyl, 6,7-indazole-diyl, 5,6-benzimidazole-diyl, and 6,7-quinoline-diyl.

$R^{11}$ and $R^{12}$ independently represent hydrogen atom or a substituted or unsubstituted alkyl, aryl or aralkyl group, and $R^{11}$ and $R^{12}$ may be the same or different.

$R^{11}$ and $R^{12}$ may be, for example, an alkyl group such as methyl, ethyl, butyl, 2-ethylhexyl, dodecyl, or octadecyl, an aryl group such as phenyl or naphthyl, or an aralkyl group such as benzyl or phenethyl.

When $R^{11}$ or $R^{12}$ is substituted, specific examples of the substituent for the group include hydroxyl group, an alkoxy group having from 1 to 18 carbon atoms, a cyano group, an alkylamino group having from 1 to 18 carbon atoms, a dialkylamino group having two alkyl groups each with from 1 to 18 carbon atoms, a halogen atom, an aryl group having from 6 to 15 carbon atoms, and an acyl group having up to 18 carbon atoms.

$Ar^1$, $Ar^2$, $Ar^3$, $Ar^4$, $Ar^5$, and $Ar^6$ independently represent a substituted or unsubstituted arylene group.

As $Ar^1$, $Ar^2$, $Ar^3$, $Ar^4$, $Ar^5$, and $Ar^6$, there may be mentioned an arylene group such as phenylene, naphthalene, anthrylene, biphenylene, or terphenylene.

When $Ar^1$, $Ar^2$, $Ar^3$, $Ar^4$, $Ar^5$, or $Ar^6$ is substituted, specific examples of the substituent for the group may include hydroxyl group, an alkoxy group having from 1 to 18 carbon atoms, a cyano group, an alkylamino group having from 1 to 18 carbon atoms, a dialkylamino group having two alkyl groups each with from 1 to 18 carbon atoms, a halogen atom, an aryl group having from 6 to 15 carbon atoms, and an acyl group having up to 18 carbon atoms.

The tetrakisazo compounds for use in the present invention will be illustrated further concretely hereinafter, but the examples of the compounds mentioned below are not intended to restrict the scope of the present invention. For instance, specific examples of the tetrakisazo compounds are those represented by the following formula (1') where the substituents are indicated in Table 1 below (formulae 2 to 17). $A_1$ in the formulae 2 to 17 is the coupler residue as indicated in Table 2 or Table 3 below.

TABLE 1

$$A_1-N=N-Ar^1 \diagdown \quad \quad R^{11} \quad \quad Ar^5-N=N-A_1$$
$$\quad \quad \quad \quad \quad N-Ar^3-\underset{R^{12}}{\overset{|}{C}}-Ar^4-N$$
$$A_1-N=N-Ar^2 \diagup \quad \quad \quad \quad \quad \quad Ar^6-N=N-A_1 \quad [1']$$

| No. of Formula | $Ar^1$ | $Ar^2$ | $Ar^3$ | $R^{11}$ | $R^{12}$ | $Ar^4$ | $Ar^5$ | $Ar^6$ |
|---|---|---|---|---|---|---|---|---|
| [2] | –⟨phenyl⟩– | –⟨phenyl⟩– | –⟨phenyl⟩– | H— | H— | –⟨phenyl⟩– | –⟨phenyl⟩– | –⟨phenyl⟩– |
| [3] | " | " | " | CH$_3$— | " | " | " | " |
| [4] | " | " | " | C$_2$H$_5$— | " | " | " | " |
| [5] | " | " | " | n-C$_5$H$_{11}$— | " | " | " | " |
| [6] | " | " | " | n-C$_{11}$H$_{23}$— | " | " | " | " |
| [7] | " | " | " | n-C$_{17}$H$_{35}$— | " | " | " | " |
| [8] | –⟨phenyl⟩– | –⟨phenyl⟩– | –⟨phenyl⟩– | CH$_3$— | CH$_3$— | –⟨phenyl⟩– | –⟨phenyl⟩– | –⟨phenyl⟩– |
| [9] | " | " | " | —(CH$_2$)$_5$— | | " | " | " |
| [10] | " | " | " | ⟨phenyl⟩— | H— | " | " | " |
| [11] | " | " | " | ⟨naphthyl⟩— | H— | " | " | " |
| [12] | " | " | " | Cl—⟨phenyl⟩— | H— | " | " | " |
| [13] | " | " | " | NC—⟨phenyl⟩— | H— | " | " | " |

TABLE 1-continued $$A_1-N=N-Ar^1 \quad\quad\quad R^{11} \quad\quad\quad Ar^5-N=N-A_1 \quad\quad [1']$$
$$\phantom{A_1-N=N-Ar^1}\searrow N-Ar^3-\underset{R^{12}}{\overset{R^{11}}{C}}-Ar^4-N\swarrow$$
$$A_1-N=N-Ar^2\phantom{-N-Ar^3-C-Ar^4-N}Ar^6-N=N-A_1$$

| No. of Formula | Ar$^1$ | Ar$^2$ | Ar$^3$ | R$^{11}$ | R$^{12}$ | Ar$^4$ | Ar$^5$ | Ar$^6$ |
|---|---|---|---|---|---|---|---|---|
| [14] |  |  |  | H— | H— |  |  |  |
| [15] | " | " | " | " | " |  | " | " |
| [16] | " | " | 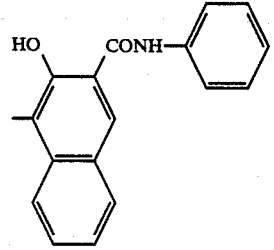 | " | " | 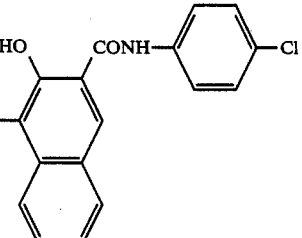 | " | " |
| [17] | " | " |  | " | " | " | " | " |

TABLE 2

| No. of A$_1$ | A$_1$ |
|---|---|
| (A$_1$-1) |  |
| (A$_1$-2) | 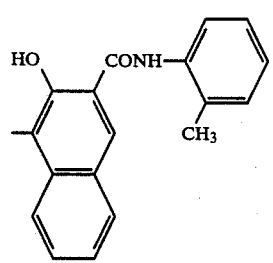 |
| (A$_1$-3) | 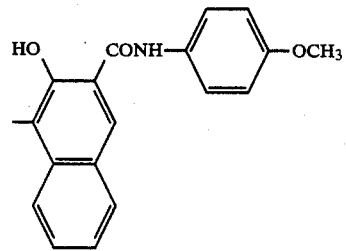 |

TABLE 2-continued

| No. of A$_1$ | A$_1$ |
|---|---|
| (A$_1$-4) |  |
| (A$_1$-5) | 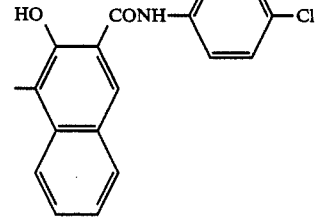 |
| (A$_1$-6) | 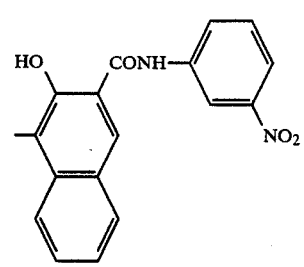 |

TABLE 2-continued

| No. of A₁ | A₁ |
|---|---|
| (A₁-7) | 3-hydroxy-4-methyl-N-(4-methylphenyl)-2-naphthamide |
| (A₁-8) | 3-hydroxy-4-methyl-N-(3-chlorophenyl)-2-naphthamide |
| (A₁-9) | 3-hydroxy-4-methyl-N-(4-ethoxyphenyl)-2-naphthamide |
| (A₁-10) | 3-hydroxy-4-methyl-N-(4-chloro-2-methylphenyl)-2-naphthamide |
| (A₁-11) | 3-hydroxy-4-methyl-N-(5-chloro-2-methylphenyl)-2-naphthamide |
| (A₁-12) | 3-hydroxy-4-methyl-N-(2,4-dimethylphenyl)-2-naphthamide |
| (A₁-13) | 3-hydroxy-4-methyl-N-(5-chloro-2-methoxyphenyl)-2-naphthamide |
| (A₁-14) | 3-hydroxy-4-methyl-N-(2,5-dimethoxyphenyl)-2-naphthamide |
| (A₁-15) | 3-hydroxy-4-methyl-N-(4-chloro-2,5-dimethoxyphenyl)-2-naphthamide |
| (A₁-16) | 3-hydroxy-4-methyl-N-(5-chloro-2,4-dimethoxyphenyl)-2-naphthamide |

TABLE 2-continued
| No. of $A_1$ | $A_1$ |
|---|---|
| ($A_1$-17) | 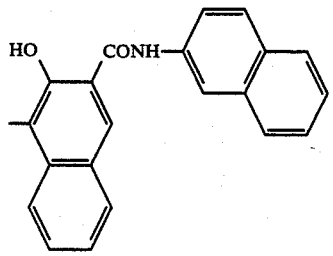 |
| ($A_1$-18) | 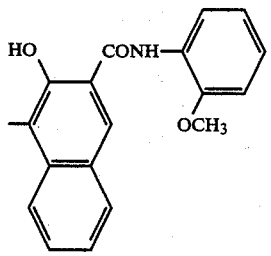 |
| ($A_1$-19) | 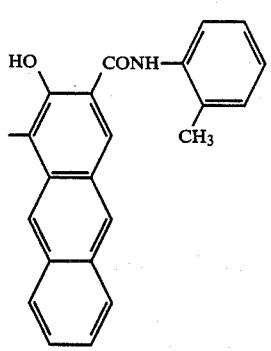 |
| ($A_1$-20) | 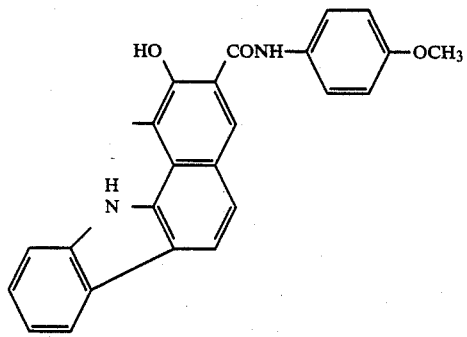 |
| ($A_1$-21) | |
TABLE 2-continued
| No. of $A_1$ | $A_1$ |
|---|---|
| ($A_1$-22) | 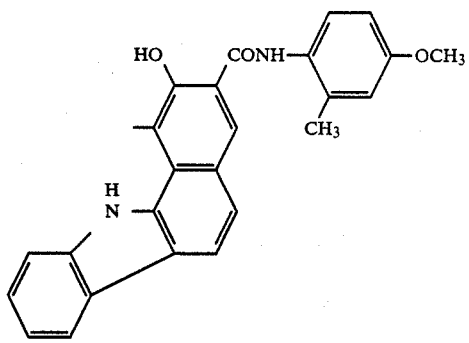 |
| ($A_1$-23) | 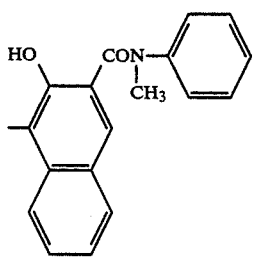 |
| ($A_1$-24) | 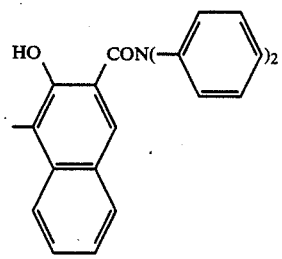 |
| ($A_1$-25) | 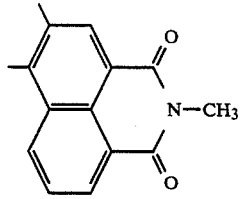 |
| ($A_1$-26) | 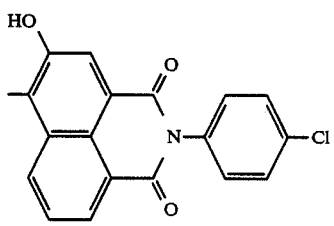 |
| ($A_1$-27) | 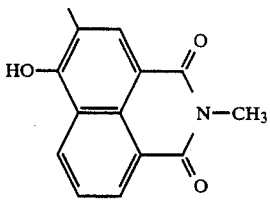 |

TABLE 2-continued
| No. of A₁ | A₁ |
|---|---|
| (A₁-28) | 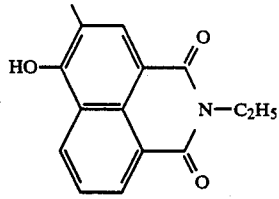 |
| (A₁-29) | 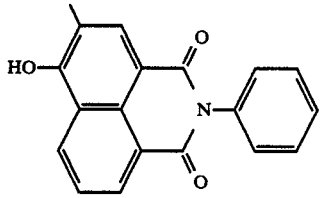 |
| (A₁-30) | 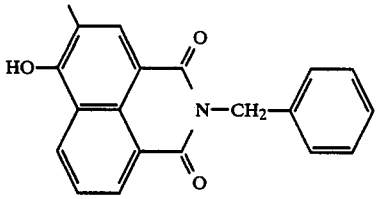 |
| (A₁-31) | 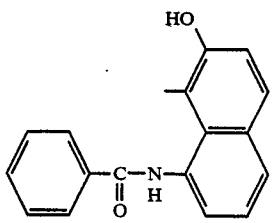 |
| (A₁-32) | 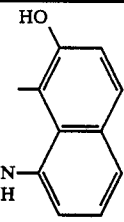 |
| (A₁-33) | 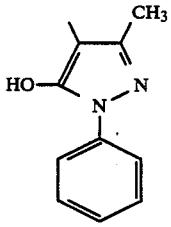 |
| (A₁-34) | 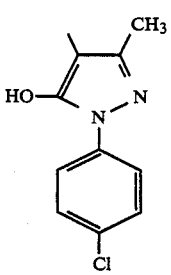 |
| (A₁-35) | 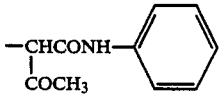 |
| (A₁-36) | —CHCONH—[2-naphthyl]<br>COCH₃ |

TABLE 3
| $A_1$ | Ar | | | | | | | | |
|---|---|---|---|---|---|---|---|---|---|
| | 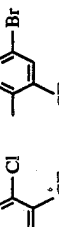 | 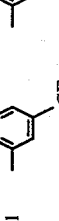 |  | 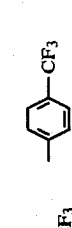 | 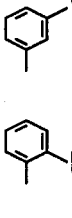 |  |  | 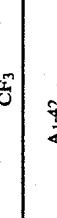 |  |
|  | $A_1$-37 | $A_1$-38 | $A_1$-39 | $A_1$-40 | $A_1$-41 | $A_1$-42 | $A_1$-43 | $A_1$-44 | $A_1$-45 |
|  | $A_1$-49 | $A_1$-50 | $A_1$-51 | $A_1$-52 | $A_1$-53 | $A_1$-54 | $A_1$-55 | $A_1$-56 | $A_1$-57 |
|  | $A_1$-61 | $A_1$-62 | $A_1$-63 | $A_1$-64 | $A_1$-65 | $A_1$-66 | $A_1$-67 | $A_1$-68 | $A_1$-69 |
|  | $A_1$-73 | $A_1$-74 | $A_1$-75 | $A_1$-76 | $A_1$-77 | $A_1$-78 | $A_1$-79 | $A_1$-80 | $A_1$-81 |

TABLE 3-continued

| $A_1$ | | | | | | | | | |
|---|---|---|---|---|---|---|---|---|---|
| HO-CONH-Ar, dibenzofuran with methyl | $A_1$-85 | $A_1$-86 | $A_1$-87 | $A_1$-88 | $A_1$-89 | $A_1$-90 | $A_1$-91 | $A_1$-92 | $A_2$-93 |

| $A_1$ | Ar | | | | | | | |
|---|---|---|---|---|---|---|---|---|
| | 3-CF$_3$-4-F-phenyl | 4-F-3-CF$_3$-phenyl | 4-CF$_3$-2-F-phenyl | 2-C$_2$F$_5$-phenyl | 3-C$_3$F$_7$-phenyl | 4-C$_6$F$_{13}$-phenyl | 3,5-bis(CF$_3$)-phenyl | 4-NO$_2$-2-CF$_3$-phenyl |
| HO-CONH-Ar naphthalene-methyl | $A_1$-46 | $A_1$-47 | $A_1$-48 | $A_1$-97 | $A_1$-98 | $A_1$-99 | $A_1$-100 | $A_1$-101 |
| HO-CONH-Ar naphthalene-NH-phenyl | $A_1$-58 | $A_1$-59 | $A_1$-60 | $A_1$-109 | $A_1$-110 | $A_1$-111 | $A_1$-112 | $A_1$-113 |
| HO-CONH-Ar anthracene-methyl | $A_1$-70 | $A_1$-71 | $A_1$-72 | $A_1$-121 | $A_1$-122 | $A_1$-123 | $A_1$-124 | $A_1$-125 |

TABLE 3-continued
| $A_1$ | | | | | | | | | | | | | |
|---|---|---|---|---|---|---|---|---|---|---|---|---|---|
| 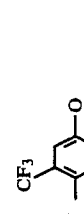 | $A_1$-82 | $A_1$-83 | $A_1$-84 | | $A_1$-133 | $A_1$-134 | $A_1$-135 | $A_1$-136 | $A_1$-137 |
| 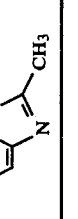 | $A_1$-94 | $A_1$-95 | $A_1$-96 | | $A_1$-145 | $A_1$-146 | $A_1$-147 | $A_1$-148 | $A_1$-149 |
| $A_1$ | Ar | | | | | | | |
|---|---|---|---|---|---|---|---|---|
| |  |  |  |  | 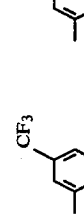 | 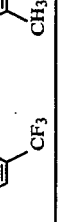 |  |
|  | $A_1$-102 | $A_1$-103 | $A_1$-104 | $A_1$-105 | $A_1$-106 | $A_1$-107 | $A_1$-108 |
| | $A_1$-114 | $A_1$-115 | $A_1$-116 | $A_1$-117 | $A_1$-118 | $A_1$-119 | $A_1$-120 |
|  | | | | | | | |

TABLE 3-continued

| | | | | | | | |
|---|---|---|---|---|---|---|---|
| (structure: HO, CONH–Ar, naphthalene-methyl) | A₁-126 | A₁-127 | A₁-128 | A₁-129 | A₁-130 | A₁-131 | A₁-132 |
| (structure: HO, CONH–Ar, carbazole-methyl, HN) | A₁-138 | A₁-139 | A₁-140 | A₁-141 | A₁-142 | A₁-143 | A₁-144 |
| (structure: HO, CONH–Ar, dibenzofuran-methyl, O) | A₁-150 | A₁-151 | A₁-152 | A₁-153 | A₁-154 | A₁-155 | A₁-156 |

TABLE 4

| No. of A | A₁ |
|---|---|
| (A₁-157) | 3-hydroxy-4-methyl-2-naphthoyl hydrazone of (4-chlorophenyl)(phenyl)methanone |
| (A₁-158) | 3-hydroxy-4-methyl-2-naphthoyl hydrazone of 3-methylbenzaldehyde |
| (A₁-159) | 3-hydroxy-4-methyl-2-naphthoyl hydrazone of acetophenone |
| (A₁-160) | 3-hydroxy-4-methyl-2-naphthoyl hydrazone of phenyl(4-pyridyl)methanone |
| (A₁-161) | 3-hydroxy-4-methyl-2-naphthoyl hydrazone of (1-naphthyl)(phenyl)methanone |

TABLE 4-continued

| No. of A | A₁ |
|---|---|
| (A₁-162) | 3-hydroxy-4-methyl-2-naphthoyl hydrazone of [2'-(N-ethylamino)biphenyl-2-yl](phenyl)methanone |
| (A₁-163) | 3-hydroxy-4-methyl-2-naphthoyl hydrazone of diphenylmethanone |
| (A₁-164) | 3-hydroxy-4-methyl-2-naphthoyl hydrazone of (methoxymethyl)(phenyl)methanone |
| (A₁-165) | 3-hydroxy-4-methyl-2-naphthoyl hydrazone of (chloromethyl)(phenyl)methanone |
| (A₁-166) | 3-hydroxy-4-methyl-2-naphthoyl hydrazone of bis(3-methoxyphenyl) / (2,4-dimethoxyphenyl)methanone |

TABLE 4-continued

| No. of A | A₁ |
|---|---|
| (A₁-167) | (phenyl-substituted naphthalimide with OH and CH₃) |
| (A₁-168) | (4-methylphenyl-substituted naphthalimide with OH and CH₃) |
| (A₁-169) | (2,5-dimethylphenyl-substituted naphthalimide with OH and CH₃) |
| (A₁-170) | (quinoline-substituted naphthalimide with OH and CH₃) |
| (A₁-171) | (4-chlorophenyl-substituted naphthalimide with OH and CH₃) |
| (A₁-172) | (4-nitrophenyl-substituted naphthalimide with OH and CH₃) |
| (A₁-173) | (naphthyl-substituted naphthalimide with OH and CH₃) |
| (A₁-174) | (4-hydroxyphenyl-substituted naphthalimide with OH and CH₃) |

TABLE 4-continued
| No. of A | A₁ |
|---|---|
| (A₁-175) | 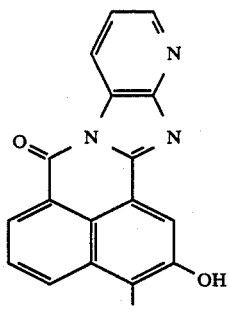 |
| (A₁-176) | 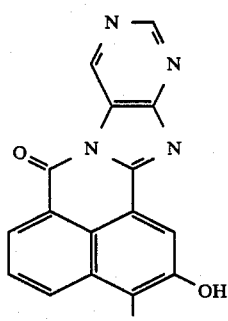 |
| (A₁-177) | 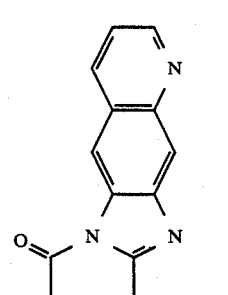 |
| (A₁-178) | 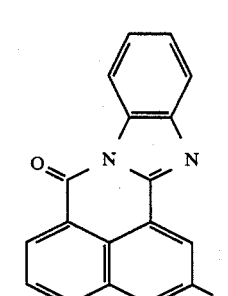 |
| (A₁-179) | 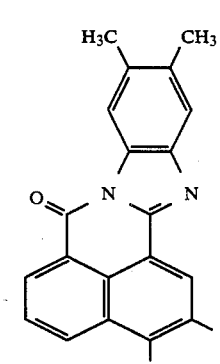 |
| (A₁-180) | 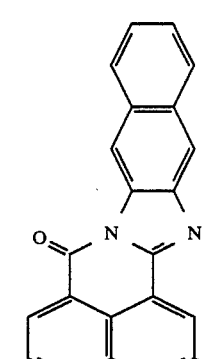 |
| (A₁-181) | 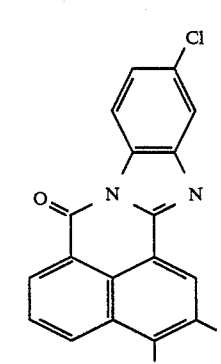 |
| (A₁-182) | 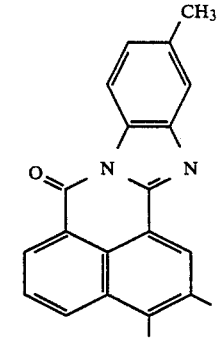 |

TABLE 4-continued

| No. of A | A₁ |
|---|---|
| (A₁-183) | 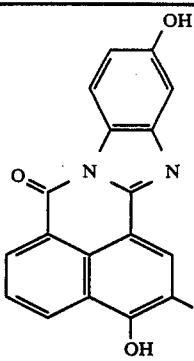 |
| (A₁-184) | |

The new tetrakisazo compounds for use in the present invention can be produced with ease by conventional methods. For example, the tetrakisazo compounds of the aforesaid formula (2) can be produced by the method described below.

The compound of the following formula (18) whee R is hydrogen atom, which may be obtained with ease by tetraphenylating 4,4″-diaminodiphenylmethane (a product of Aldrich Chemical Co.), is nitrated with nitric acid under appropriate conditions, for example, in acetic anhydride to obtain a compound of the formula (18) where R is a nitro group. Next, the resulting compound is reduced under appropriate conditions, for example, with iron powder and dilute hydrochloric acid or with stannous chloride and hydrochloric acid, to give a compound of the formula (18) where R is NH₂. Next, the compound is diazotized and then coupled with the corresponding coupler (e.g., naphthol AS) whereby the intended tetrakisazo compound of the formula (18) can be obtained with ease. As one specific example, production of the compound of the formula (2) where A₁ is No. A₁-21 is illustrated hereunder.

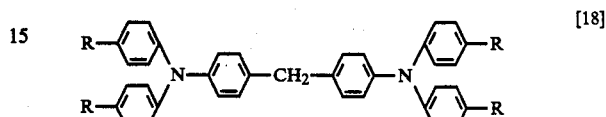

Production Example:

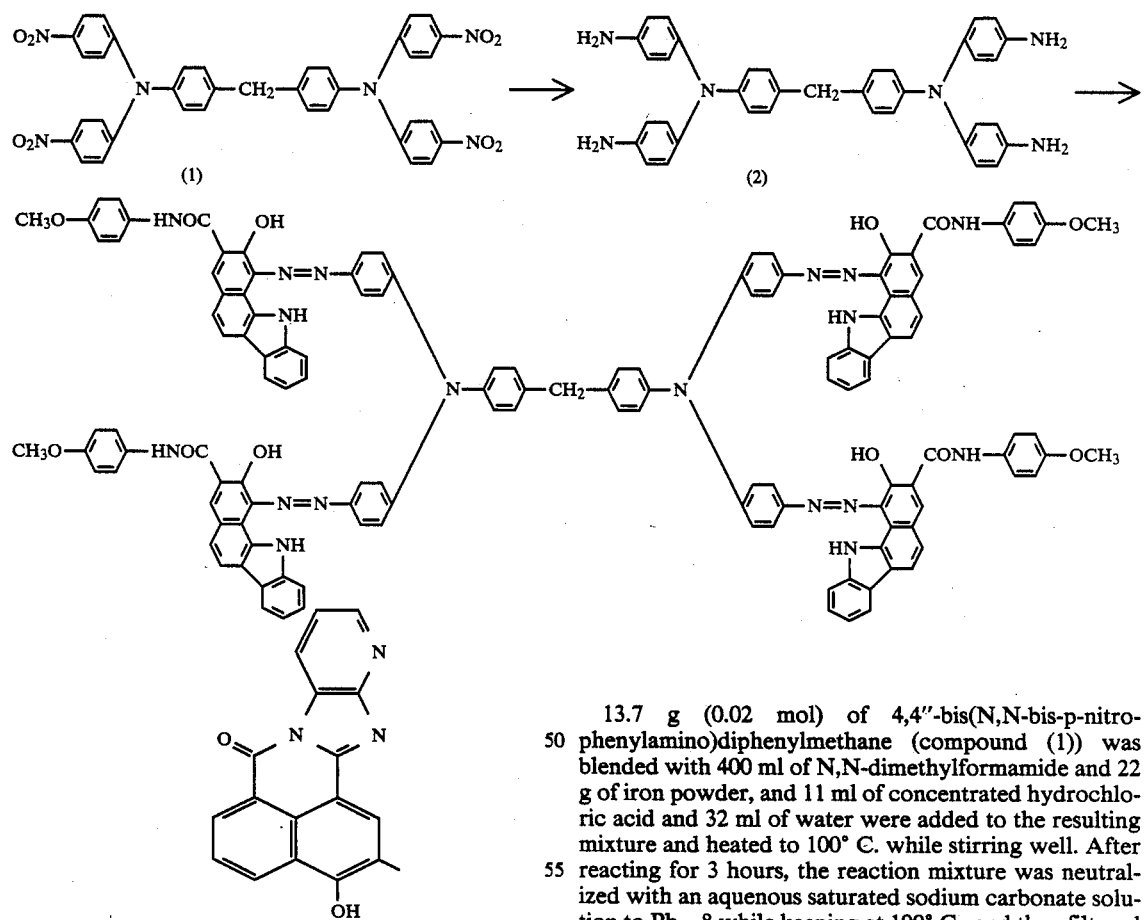

13.7 g (0.02 mol) of 4,4″-bis(N,N-bis-p-nitrophenylamino)diphenylmethane (compound (1)) was blended with 400 ml of N,N-dimethylformamide and 22 g of iron powder, and 11 ml of concentrated hydrochloric acid and 32 ml of water were added to the resulting mixture and heated to 100° C. while stirring well. After reacting for 3 hours, the reaction mixture was neutralized with an aqueous saturated sodium carbonate solution to Ph=8 while keeping at 100° C., and then filtered while hot. The resulting filtrate was poured into 2 liter of ice-water, and the amino compound (2) precipitated was taken out by filtration and dried. Yield: 6.75 g (60%).

Next, 5.63 g (0.01 mol) of the amino compound (2) was added to dilute hydrochloric acid prepared from 25 of concentrated hydrochloric acid and 30 ml of water and stirred well on a water bath (60° C.) for about 30 minutes. Then the resulting mixture was cooled to 0° C. and a solution of 3.04 g of sodium nitrite dissolved in 10 ml of water was added dropwise thereto at 0° C. over a period of about 20 minutes. Afterwards, the entire mixture was stirred at the same temperature for one hour, and a small amount of unreacted substances was filtered off. The resulting filtrate was added dropwise to a mixture comprising 15.3 g (0.04 mol) of the coupler ($A_1$-21)-H and 100 ml of pyridine, which had been prepared in a different container, with ice-cooling and stirring. Afterwards, the entire mixture was stirred for 2 hours at room temperature and the reaction was finished. The reaction mixture was poured into 500 ml of water, and the crystals precipitated were removed by filtration. The thus obtained crude crystals were repeatedly washed with acetone. Thus 11.3 g of the compound (3) was obtained in the form of a black powder. Yield: 53% relative to the amino compound (2).

Decomposition Temperature: 250° C. or higher.
Elemental Analysis ($C_{133}H_{94}O_{12}N_{18}$):
Calculated C 74.78%, H 4.44%, N 11.80%
Measured C 74.56%, H 4.34%, N 11.73%
IR Absorption Spectrum (KBr tablet method):
$\nu$NH: 3250 to 3450 $cm^{-1}$
$\nu$V=O: 1660 $cm^{-1}$ The electrophotographic photoreceptor of the present invention has an electrophotographic photosensitive layer which contains one or more of the tetrakisazo compounds of the aforesaid formula. Electrophotographic photoreceptors of various types have been known, and any known type may apply to the electrophotographic photoreceptor of the present invention. Preferably, the photoreceptor of the invention has one of the following types of structures.

(I) An electrophotographic photosensitive layer having the particular tetrakisazo compound dispersed in a binder or a charge carrier-transporting medium is provided on an electroconductive support.

(II) A charge carrier-generating layer composed mainly of the particular tetrakisazo compound is provided on an electroconductive support and a charge carrier-transporting medium layer is superposed over the charge carrier-generating layer.

The tetrakisazo compound of the present invention acts as a photoconductive substance, and when this absorbs light, a charge carrier with an extremely high efficiency is generated. The thus generated charge carrier may be transported via the tetrakisazo compound as a transporting medium, but it is more effective to be transported via a charge carrier-transporting compound as a transporting medium.

For formation of the electrophotographic photoreceptor of type (I), fine grains of the tetrakisazo compound of the invention are dispersed in a binder solution or in a solution containing a charge carrier-transporting compound and a binder and the resulting dispersion may be coated on an electroconductive support and dried. The thickness of the electrophotographic photosensitive layer formed is preferably from 3 to 30 $\mu$, especially from 5 to 30 $\mu$.

For formation of the electrophotographic photoreceptor of type (II), the tetrakisazo compound of the invention is coated on an electroconductive support by vacuum evaporation plating, or a solution of the compound dissolved in a solvent such as an amine is coated on the support, or a dispersion of fine grains of the compound dispersed in an appropriate solvent optionally containing a binder dissolved therein is coated on the support; and, after drying the thus-coated layer, a solution containing a charge carrier-transporting compound and a binder is superposed over the layer and dried. The thickness of the tetrakisazo compound-containing layer, which is a charge carrier-generating layer, is preferably from 0.01 to 4 $\mu$, especially 2 $\mu$ or less; and the thickness of the charge carrier-transporting medium layer is preferably from 3 to 30 $\mu$, especially from 5 to 20 $\mu$.

The tetrakisazo compound is to be used for formation of the photoreceptors of types (I) and (II) is in the form of fine grains having a grain size of 5 $\mu$ or less, preferably 2 $\mu$ or less, as milled in a ball mill, a sand mill, a vibration mill or the like dispersing machine.

In the formation of the electrophotographic photoreceptor of type (I), if the amount of the tetrakisazo compound used is too small, the sensitivity is poor, but if too large, the charging property is poor and the strength of the photosensitive layer formed is low. Accordingly, the proportion of the tetrakisazo compound in the electrophotographic photosensitive layer is preferably from 0.01 to 2 times by weight, especially from 0.05 to 1 time by weight, of the binder therein. The proportion of the charge carrier-transporting compound, if any, is preferably from 0.1 to 2 times by weight, especially from 0.3 to 1.3 times by weight, of the binder therein. If the charge carrier-transporting compound used acts also as a binder, the amount of the tetrakisazo compound to be added is preferably from 0.01 to 0.5 time by weight of the binder.

In formation of the tetrakisazo compound-containing layer, which is a charge carrier-generating layer, for producing the electrophotographic photoreceptor of type (II), the amount of the tetrakisazo compound is preferably from 0.1 to 20 times by weight of the binder. If less than this, the resulting layer does not have sufficient light sensitivity. The proportion of the charge carrier-transporting compound in the charge carrier-transporting medium is preferably from 0.2 to 2 times by weight, especially from 0.3 to 1.3 times by weight, of the binder in the medium. If a charge carrier-transporting high-molecular weight compound which acts also as a binder is used, any other binder is unnecessary.

In the formation of the electrophotographic photoreceptor of the present invention, additives, such as plasticizers or sensitizing agents may be used together with the binder.

The electroconductive support for use in the electrophotographic photoreceptor of the present invention may be a metal plate such as an aluminium, copper or zinc plate, a plastic sheet or film (e.g., a polyester sheet or film) coated with an electroconductive material (e.g., iridium oxide, $SnO_2$) by vacuum evaporation plating or dispersion coating, or a paper processed to have electroconductivity.

As a binder, it is preferred to use an electrically insulating and film-forming high-molecular weight polymer which is hydrophobic and which has a high dielectric constant. Examples of suitable high-molecular weight polymers are set forth below, which, of course, are not limitative.

Polycarbonate, polyester, methacrylic resin, acrylic resin, polyvinyl chloride, polyvinylidene chloride, polystyrent, polyvinyl acetate, styrene/butadiene copolymer, vinylidene chloride/acrylonitrile copolymer, vinyl chloride/vinyl acetate copolymer, vinyl chloride/vinyl acetate/maleic anhydride copolymer, silicone resin, silicone-alkyd resin, poly-N-vinylcarbazole.

These binders may be used singly or in the form of a mixture of two or more.

As a plasticizer, there may be mentioned, for example, biphenyl, biphenyl chloride, o-terphenyl, p-terphenyl, dibutyl phthalate, dimethylene glycol phthalate, dioctyl phthalate, triphenyl phosphate, methylnaphthalene, benzophenone, chlorinated paraffin, polypropylene, polystyrene, dilaurylthio dipropionate, 3,5-dinitrosalicylic acid, and various fluorohydrocarbons.

In addition, a silicone oil or the like may be added so as to improve the surface property of the electrophotographic photoreceptor.

As a sensitizing agent, there may be mentioned, for example, chloranyl, tetracyanoethylene, Methyl Violet, Rhodamine B, cyanine dyes, merocyanine dyes, pyrylium dyes, and thiapyrylium dyes.

Charge carrier-transporting compounds are generally grouped into two groups, electron-transporting compounds and positive hole-transporting compounds. Both of the groups may be used in the electrophotographic photoreceptor of the present invention. The electron-transporting compounds are electron-attracting group-containing compounds, which include, for example, 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole-chloranyl, 2,3-dichloro-5,6-dicyanobenzsoquinone,2,4,7-trinitor-9,10-phenanthrenequinone, tetrachlorophthalic anhydride, tetracyanoethylene, and tetracyanoquinodimethane.

The positive hole-transporting compounds are electron-donating group-containing compounds, and examples of the compounds are set forth below.

High-Moledular Weight Compounds:

(1) Polyvinylcarbazole and derivatives thereof described in JP-B-34-10966.

(2) Vinyl polymers (e.g., polyvinylpyrene, polyvinylanthracene, poly-2-vinyl-4-(4'-dimethylaminophenyl)-5-phenyloxazole, poly-3-vinyl-N-ethylcarbazole) described in JP-B-43-18674 and JP-B-43-19192.

(3) Polymers (e.g., polyacenaphthylene, polyindene, acenaphthylene/styrene copolymer) described in JP-B-43-19193.

(4) Condensed resins (e.g., pyrene/formaldehyde resin, bromopyrene/formaldehyde resin, ethylcarbazole/formaldehyde resin) described in JP-B-56-13940.

(5) Various triphenylmethane polymers described in JP-A-56-90883 and JP-A-56-161550.

Low-Molecular Weight Compounds:

(6) Triazole derivatives described in U.S. Pat. No. 3,112,197.

(7) Oxadiazole derivatives described in U.S. Pat. No. 3,189,447.

(8) Imidazole derivatives described in JP-B-37-16096.

(9) Polyarylalkane derivatives described in U.S. Pat. Nos. 3,615,402, 3,820,989 and 3,542,544, JP-B-45-555, JP-B-51-10983, JP-A-51-93224, JP-A-55-108667, JP-A-55-156953, and JP-A-56-36656.

(10) Pyrazoline derivatives and pyrazolone derivatives described in U.S. Pat. Nos. 3,180,729 and 4,278,746, JP-A-55-88064, JP-A-55-88065, JP-A-49-105537, JP-A-55-51086, JP-A-56-80051, JP-A-56-88141, JP-A-57-45545, JP-A-54-112637, and JP-A-55-74546.

(11) Phenylenediamine derivatives described in U.S. Pat. No. 3,615,404, JP-B-51-10105, JP-A-54-83445, JP-A-54-110836, JP-A-54-119925, JP-B-46-3712, and JP-B-47-28336.

(12) Arylamine derivatives described in U.S. Pat. No. 3,567,450, JP-B-49-35702, West German Patent (DAS) 1,110,518, U.S. Pat. Nos. 3,180,703, 3,240,597, 3,658,520, 4,232,103, 4,175,961 and 4,012,376, JP-A-55-144250, JP-A-56-119132, JP-B-3927577, and JP-A-56-22437.

(13) Amino-substituted chalcone derivatives described in U.S. Pat. No. 3,526,501.

(14) N,N-bicarbazyl derivatives described in U.S. Pat. No. 3,542,546.

(15) Oxazole derivatives described in U.S. Pat. No. 3,257,203.

(16) Styrylanthracene derivatives described in JP-A-56-46234.

(17) Fluorenone derivatives described in JP-A-54-110837.

(18) Hydrazone derivatives described in U.S. Pat. No. 3,717,462, JP-A-54-59143 (corresponding to U.S. Pat. No. 4,150,987), JP-A-55-52063, JP-A-55-52064, JP-A-55-46760, JP-A-55-85495, JP-A-57-11350, JP-A-57-148749, and JP-A-57-104144.

(19) Benzidine derivatives described in U.S. Pat. Nos. 4,047,948, 4,047,949, 4,265,990, 4,273,846, 4,299,897 and 4,306,008.

(20) Stilbene derivatives described in JP-A-58-190953, JP-A-59-95540, JP-A-59-97148, JP-A-59-195658, and JP-A-62-36674.

The charge carrier-transporting compounds for use in the present invention are not limited to only the above-mentioned compounds (1) to (20) but any other known charge carrier-transporting compounds may of course be used in the present invention.

Two or more kinds of charge carrier-transporting compounds can be used together, if desired.

In the photoreceptor thus obtained in accordance with the present invention, an adhesive layer or a barrier layer may optionally be provided between the electroconductive support and the photosensitive layer, if desired. As the materials to be used for formation of the optional adhesive or barrier layer, there are the above-mentioned high-molecular weight polymers which may be used for a binder, as well as gelatin, casein, polyvinyl alcohol, ethyl ceuulose, carboxymethyl cellulose, the vinylidene chloride polymer latex described in JP-A-59-84247, the styrene/butadiene polymer latex described in JP-A-59-114544, and aluminium oxide. The thickness of the layer is preferably 1 μm or less.

As described in detail above, the electrophotographic photoreceptor of the present invention is characterized by high sensitivity and superior durability.

The electrophotographic photoreceptor of the present invention may widely be applied to various fields of electrophotographic copying machines as well as printers using a laser beam or a Braun tube as a light source.

The tetrakisazo compound-containing photoconductive composition of the present invention can be used as a photoconductive layer in a picture-taking tube in a video camera, or as a photoconductive layer in a picture-taking solid element which has a light-receiving layer (photoconductive layer) provided on the entire surface of a known one-dimensionally or two-dimensionally arranged semiconductor circuit for transportation or scanning of signals. In addition, the composition may also be used as a photoconductive layer for a solar battery, as described in A. K. Ghosh and Tom Feng, *J. Appl. Phys.*, 49 (12), 5982 (1978).

Further, the tetrakisazo compound of the present invention can also be used as photoconductive colored grains in a photoelectrophoresis system or as colored grains in dry or wet electrophotographic developer.

In accordance with the disclosure in JP-B-37-17162, JP-A-55-19063, JP-A-55-161250, and JP-A-57-147656, the tetrakisazo compound of the present invention can be dispersed in the above-mentioned bharge carrier-transporting compound (e.g., oxadiazole derivatives, hydrazone derivatives) together with an alkali-soluble resin liquid (e.g., phenol resin), and the resulting dispersion may be coated and dried on an electroconductive support (e.g., aluminium). Then the thus coated support is imagewise exposed, developed with a toner, and etched with an aqueous alkaline solution to obtain a printing plate having high resolving power, high durability and high sensitivity. In the same manner, a printed circuit may also be prepared.

The following examples are intended to illustrate the present invention in greater detail but not to limit it in any way. Unless otherwise indicated, the term "part" means "part by weight". Also, unless otherwise indicated, cell percents, ratios, etc. are by weight.

EXAMPLE 1

One part of the tetrakisazo compound of the formula (2) where $A_1$ is No. $A_1$-21 (prepared in the aforesaid Production Example), 5 parts of 4,4'-bis(diethylamino-2,2'-dimethyltriphenylmethane and 5 parts of polycarbonate of bisphenol A were added to 95 parts of dichloromethane and milled and blended in a ball mill to prepare a coating liquid. This was coated on an electroconductive transparent support (prepared by coating indium oxide film on the surface of a 100 μm polyethylene terephthalate film by vacuum evaporation plating, and having a surface resistance of $10^3$ Ω) with a round wire rod and dried to obtain an electrophotographic photoreceptor having a mono-layered electrophotographic photoconductive layer with a thickness of about 8 μm.

For testing the thus prepared electrophotographic photoreceptor, an electrostatic copying tester (SP-428 type, manufactured by Kawaguchi Electric Co.) was used. Briefly, the photoreceptor was charged to be +400 V by corona discharge of +5 kV and a light was irradiated thereto with a tungsten lamp (color temperature: 2854° K.) so that the surface was 4 lux. The time required for decaying the surface potential to one half of the initial surface potential was obtained, and the half-value exposure $E_{50}$ (lux.sec) was calculated therefrom, which was 7.2 lux.sec.

EXAMPLES 2 TO 11

The process of Example 1 was repeated except that the tetrakisazo compound shown in Table 5 below was used in place of the tetrakisazo compound produced by the Production Example. Thus various mono-layered electrophotographic photoreceptors were prepared, and these were tested in the same manner as in Example 1. The half-value exposure $E_{50}$ by positive charge was obtained in each sample. The results obtained are shown in Table 5.

TABLE 5

| Example No. | Tetrakisazo Compound | | $E_{50}$ (lux · sec) |
|---|---|---|---|
| | No. of Formula | $A_1$ | |
| 2 | (2) | $A_1$-22 | 3.6 |
| 3 | (2) | $A_1$-1 | 4.5 |
| 4 | (2) | $A_1$-5 | 13.1 |
| 5 | (2) | $A_1$-53 | 4.0 |
| 6 | (2) | $A_1$-157 | 5.7 |
| 7 | (2) | $A_1$-167 | 6.1 |
| 8 | (7) | $A_1$-21 | 3.5 |
| 9 | (9) | $A_1$-21 | 6.0 |

TABLE 5-continued

| Example No. | Tetrakisazo Compound | | $E_{50}$ (lux · sec) |
|---|---|---|---|
| | No. of Formula | $A_1$ | |
| 10 | (12) | $A_1$-21 | 2.9 |
| 11 | (12) | $A_1$-22 | 7.5 |

EXAMPLE 12

5 parts of the tetrakisazo compound if the formula (2) where $A_1$ is No. $A_1$-21 (prepared in the aforesaid Production Example) was dispersed in a solution of 5 parts of polyester resin (trade name: Vilon ® 20, by Toyobo Co., Ltd.) dissolved in 50 parts of tetrahydrofuran, by ball milling for 20 hours, and the resulting dispersion was coatd on an electroconductive support (prepared by coating an aluminium coat on the surface of a 75 μm polyethylene terephthalate film by vacuum evaporation plating, and having a surface electric resistance of $4 \times 10^2$ Ω) with a round wire rod and dried to form a 0.5 μm thick charge-generating layer.

Next, a solution of 3.6 parts of p-(diphenylamino)benzaldehyde-N'-methyl-N'-phenylhydrazone represented by the following formula:

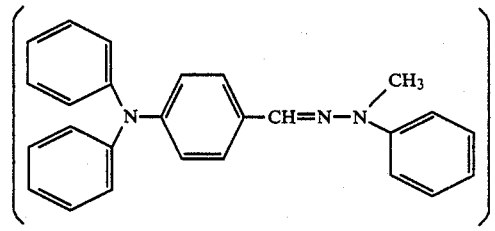

and 4 parts of polycarbonate of bisphenol A dissolved in 13.3 parts of dichloromethane and 26.6 parts of 1,2-dichloroethane was overcoated on the charge-generating layer with a round wire rod and dried to form an 11 μm thick charge-transporting layer thereon. Thus an electrophotographic photoreceptor having a two-layered photosensitive layer was prepared.

Next, the photoreceptor was charged by corona discharge of −6 kV, and the initial surface potential was represented by $V_0$. Then this was irradiated with light from a tungsten lamp so that the illuminance on the surface was 30 lux, and the exposure ($E_{50}$) necessary for decaying the surface potential to one half of the initial surface potential $V_0$ was measured. Also, the surface potential (residual potential $V_r$) after exposure with 60 lux·sec was measured.

The same measurement was also conducted after 3000 repetitions. The requests obtained are shown in Table 6 below.

TABLE 6

| | 1st Time | 3000th Time |
|---|---|---|
| $V_0$ (V) | −720 | −710 |
| $E_{50}$ (lux · sec) | 5.2 | 5.4 |
| $V_R$(V) | −5 | −6 |

EXAMPLES 13 TO 22

The process of Example 12 was repeated except that the tetrakisazo compound shown in Table 7 below was used in place of the tetrakisazo compound of Example 12. Thus various two-layered electrophotographic photoreceptors were prepared, and these were tested in the same manner as in Example 12. The half-value exposure $E_{50}$ was obtained in each sample. The results are shown in Table 7.

TABLE 7

| Example No. | No. of Formula | $A_1$ | $E_{50}$ (Lux · sec) |
|---|---|---|---|
| 13 | (2) | $A_1$-22 | 3.4 |
| 14 | (2) | $A_1$-1 | 4.2 |
| 15 | (2) | $A_1$-5 | 11.0 |
| 16 | (2) | $A_1$-53 | 3.6 |
| 17 | (2) | $A_1$-157 | 5.2 |
| 18 | (2) | $A_1$-167 | 6.3 |
| 19 | (7) | $A_1$-21 | 3.0 |
| 20 | (9) | $A_1$-21 | 7.0 |
| 21 | (12) | $A_1$-21 | 2.8 |
| 22 | (12) | $A_1$-22 | 6.0 |

EXAMPLE 23

5 parts of the tetrakisazo compound of the formula (2) where $A_1$ is No. $A_1$-21 (prepared in the Production Example), 40 parts of the hydrazone compound used in Example 12, and 100 parts of a benzyl methacrylate/methacrylic acid copolymer ($[\eta]$=0.12 at 30° C. in methyl ethyl ketone, methacrylic acid content: 32.9%) were added to 660 parts of dishloromethane and ultrasonically dispersed.

The resulting dispersion was coated on a sand-processed 0.25 mm-thick aluminium plate and dried to prepare an electrophotographic photosensitive printing plate material having an electrophotographic photosensitive layer with a dry thickness of 6 μm.

The sample was charged by corona discharge (+6 kv) in the dark so that the surface potential of the photosensitive layer was charged to be about +600 V. Next, a tungusten light (color temperature: 2854° K.) was irradiated on the surface of the sample with an illuminance of 2.0 lux, whereupon the half-value exposure $E_{50}$ was 6.2 lux·sec.

Next, the sample was charged to have a surface potential of about +400 V in the dark and then imagewise exposed through a positive image-having transmittable original attached thereto. The thus exposed sample was dipped in a liquid developer containing a toner prepared by adding 5 parts of fine polymethyl methacrylate grain (toner) dispersion and 0.01 part of soybean lecithin to 1000 parts of Isoper® H (petroleum solvent, manufactured by Esso Standard Co.), to obtain a sharp positive toner image.

Then this was heated at 100° C. for 30 seconds to fix the toner image. The thus prepared printing plate material was dipped in a solution of 70 parts of sodium metasilicate hydrate dissolved in 140 parts of glycerin, 550 parts of ethylene glycol and 150 parts of ethanol for about 1 minute and then washed by gently brushing the surface with flowing water, whereby the photosensitive layer to which the toner had not been adhered was removed. Thus a printing plate was obtained.

In place of the liquid developer, the electrostatic latent image was developed by magnetic brush-development with Xerox® 3500 Toner (manufactured by Fuji Xerox Co., Ltd.) and then heated at 80° C. for 30 seconds for fixation. Then the photosensitive layer with no toner was removed by the use of an alkaline solution to obtain a printing plate.

The thus prepared printing plate was placed in a Hamada Star 600 CD offset printing machine and printing was conducted in a conventional manner. 50,000 prints which were all extremely sharp with no background stain could not obtained.

While the invention has been described in detail and with reference to specific embodiments thereof, it will be apparent to one skilled in the art that various changes and modifications can be made therein without departing from the spirit and scope thereof.

What is claimed is:

1. A photoconductive composition comprising at least one tetrakisazo represented by the following formula (1):

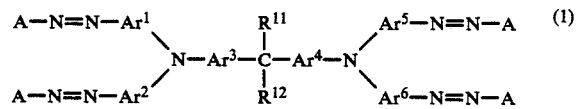

where $R^{11}$ and $R^{12}$ independently represent hydrogen atom or a substituted or unsubstituted alkyl, aryl or aralkyl group, and $R^{11}$ and $R^{12}$ may be the same or different or $R^{11}$ and $R^{12}$ may be taken together to form a ring; $Ar^1$, $ar^2$, $Ar^3$, $Ar^4$, $Ar^5$, and $Ar^6$ independently represent a substituted or unsubstituted arylene group;

A represents

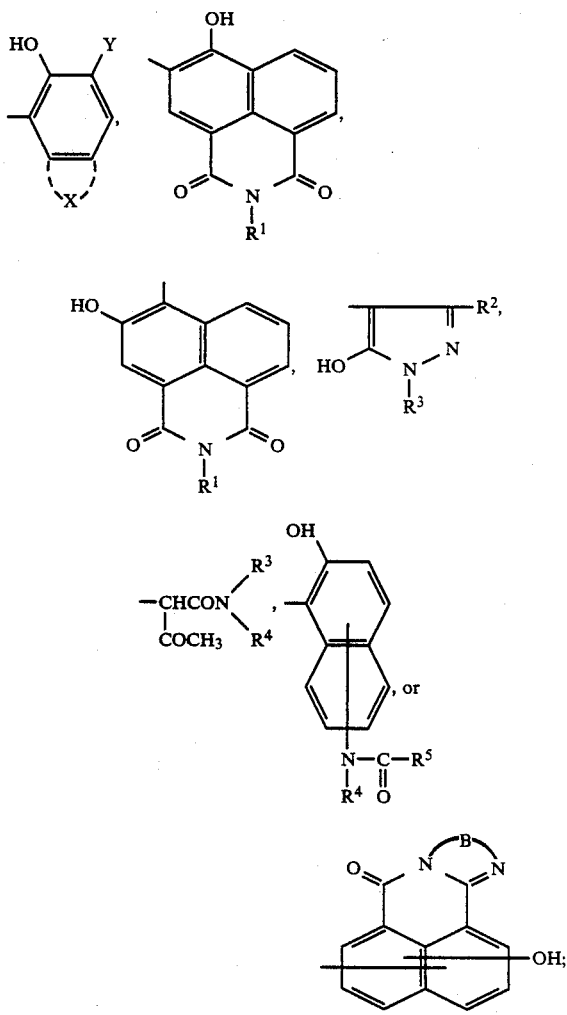

X represents a group that forms an aromatic ring or a heterocyclic ring, which is substituted or unsubstituted, by condensation with the benzene ring in the aforesaid formula having a hydroxyl group and Y on the ring;

Y represents

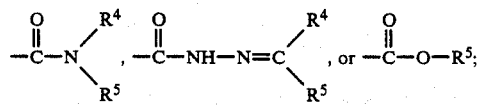

R$^1$ represents an alkyl group, a phenyl group or a substituted group thereof;

R$^2$ represents a hydrogen atom, a lower alkyl group, a carbamoyl group, a carboxyl group, an alkoxycarbonyl group, an aryloxycarbonyl group, or a substituted or unsubstituted amino group;

R$^3$ represents an alkyl group, an aromatic group, a hetero-aromatic group, or a substituted group thereof;

R$^4$ and R$^5$ independently represent a hydrogen atom, an alkyl group, an aromatic group, a hetero-aromatic group, or a substituted group thereof, provided that both R$^4$ and R$^5$ are not hydrogen atoms at the same time, and when Y represents

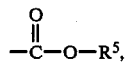

R$^5$ is not a hydrogen atom; and

B represents a divalent group that forms an aromatic hydrocarbon or a divalent group that forms a hetero ring which contains one or more nitrogen atoms in the ring, and the ring is unsubstituted or substituted.

2. A composition as in claim 1, wherein said aromatic group represented by R$^3$, R$^4$ and R$^5$ is a phenyl group or a naphthyl group; and said hetero-aromatic group represented by R$^3$, R$^4$, and R$^5$ is a hetero-aromatic group having one or more hetero atoms of oxygen, nitrogen and/or sulfur.

3. A composition as in claim 1, wherein said divalent group that forms an aromatic hydrocarbon, represented by B, is an o-phenylene group, an o-naphthylene group, a peri-naphthylene group, a 1,2-anthraquinolene group, or a 9,10-phenanthrylene group; and said divalent group that forms a hetero ring, represented by B, is a 3,4-pyrazolediyl group, a 2,3-pyridiyl group, a 4,5-pyrimidine-diyl group, a 6,7-indazole-diyl group, a 5,6-benzimidazole-diyl group, or a 6,7-quinoline-diyl group.

4. A composition as in claim 1, wherein said arylene group represented by Ar$^1$, Ar$^2$, Ar$^3$, Ar$^4$, Ar$^5$, and Ar$^6$ is a phenylene group, a naphthalene group, an anthrylene group, a biphenylene group, or a terphenylene group.

5. An electrophotographic photoreceptor having a layer which contains a charge carrier-transporting compound and a charge carrier-generating compound on an electroconductive support, wherein the charge carrier-generating compound is the tetrakisazo compound as claimed in claim 1.

6. An electrophotographic photoreceptor having a charge carrier-transporting compound-containing layer and a charge carrier-generating compound-containing layer on an electroconductive support, whrein the charge carrier-generating compound is the tetrakisazo compound as claimed in claim 1.

7. A photoreceptor as in claim 5, wherein said layer further comprises a binder.

8. A photoreceptor as in claim 6, wherein said charge carrier-generating compound-containing layer contains said tetrakisazo compound as a major component, and said charge carrier-transporting compound-containing layer is provided on said charge carrier-generating compound-containing layer.

9. A photoreceptor as in claim 5, wherein said layer has a thickness of from 3 to 30 $\mu$.

10. A photoreceptor as in claim 9, wherein said layer has a thickness of from 5 to 20 $\mu$.

11. A photoreceptor as in claim 8, where said charge carrier-generating compound-containing layer has a thickness of from 0.01 to 4 $\mu$, and said charge carrier-transporting compound-containing layer has a thickness of from 3 to 30 $\mu$.

12. A photoreceptor as in claim 11, wherein said charge carrier-generating compound-containing layer has a thickness of from 0.01 to 4 $\mu$, and said charge carrier-transporting compound-containing layer has a thickness of from 5 to 20 $\mu$.

13. A photoreceptor as in claim 5, wherein said layer further contains a binder, said tetrakisazo compound is present in said layer in an amount of from 0.01 to 2 times the weight of said binder, and said charge carrier-transporting compound is present in said layer in an amount of from 0.1 to 2 times the weight of said binder.

14. A photoreceptor as in claim 13, wherein said tetrakisazo compound is present in said layer in an amount of from 0.05 to 1 times the weight of said binder, and said charge carrier-transporting compound is present in said layer in an amount of from 0.3 to 1.3 times the weight of said binder.

15. A photoreceptor as in claim 5, wherein said tetrakisazo compound is present in said layer in an amount of from 0.01 to 0.5 times the weight of said charge carrier-transporting compound.

16. A photoreceptor as in claim 6, wherein said charge carrier-generating compound-containing layer further contains a binder, the amount of said tetrakisazo compound being from 0.1 to 20 times the weight of said binder, and said charge carrier-transporting compound-containing layer further contains a binder, the compound of said charge carrier-transporting compound being from 0.2 to 2 times the weight of said binder.

17. A photoreceptor as in claim 16, wherein the amount of said tetrakisazo compound in said charge carrier-generating compound-containing layer is from 0.1 to 20 times the weight of said binder, and the amount of said charge carrier-transporting compound in said charge carrier-transporting compound-containing layer is from 0.3 to 1.3 times the weight of said binder.

* * * * *